(12) United States Patent
Ginsburg et al.

(10) Patent No.: US 12,066,566 B2
(45) Date of Patent: *Aug. 20, 2024

(54) INTERFERENCE DETECTION IN A FREQUENCY MODULATED CONTINUOUS WAVE (FMCW) RADAR SYSTEM

(71) Applicant: Texas Instruments Incorporated, Dallas, TX (US)

(72) Inventors: Brian Paul Ginsburg, Allen, TX (US); Karthik Subburaj, Bangalore (IN); Karthik Ramasubramanian, Bangalore (IN); Sachin Bhardwaj, Bangalore (IN); Sriram Murali, Bangalore (IN); Sandeep Rao, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 380 days.

This patent is subject to a terminal disclaimer.

(21) Appl. No.: 17/462,086

(22) Filed: Aug. 31, 2021

(65) Prior Publication Data
US 2021/0389418 A1   Dec. 16, 2021

Related U.S. Application Data

(63) Continuation of application No. 16/120,129, filed on Aug. 31, 2018, now Pat. No. 11,137,476, which is a
(Continued)

(51) Int. Cl.
*G01S 7/35* (2006.01)
*G01S 7/02* (2006.01)
(Continued)

(52) U.S. Cl.
CPC .............. *G01S 7/352* (2013.01); *G01S 7/023* (2013.01); *G01S 7/40* (2013.01); *G01S 13/32* (2013.01); *G01S 13/931* (2013.01)

(58) Field of Classification Search
CPC . G01S 7/352; G01S 7/023; G01S 7/40; G01S 13/32; G01S 13/931
See application file for complete search history.

(56) References Cited

U.S. PATENT DOCUMENTS

| | | |
|---|---|---|
| 3,992,709 A | 11/1976 | Watanabe et al. |
| 4,679,048 A | 7/1987 | Brandsetter et al. |

(Continued)

FOREIGN PATENT DOCUMENTS

| | | |
|---|---|---|
| CN | 1241885 A | 1/2000 |
| CN | 1958348 A | 5/2007 |

(Continued)

OTHER PUBLICATIONS

Notification of First Office Action for Chinese Patent Application No. 20168020289574; dated Dec. 21, 2020; 1 page.
(Continued)

*Primary Examiner* — Timothy A Brainard
*Assistant Examiner* — Helena H Seraydaryan
(74) *Attorney, Agent, or Firm* — Michael T. Gabrik; Frank D. Cimino

(57) ABSTRACT

A frequency modulated continuous wave (FMCW) radar system is provided that includes a receiver configured to generate a digital intermediate frequency (IF) signal, and an interference monitoring component coupled to the receiver to receive the digital IF signal, in which the interference monitoring component is configured to monitor at least one sub-band in the digital IF signal for interference, in which the at least one sub-band does not include a radar signal.

19 Claims, 7 Drawing Sheets

Related U.S. Application Data continuation of application No. 14/679,461, filed on Apr. 6, 2015, now Pat. No. 10,067,221.

(51) Int. Cl.
*G01S 7/40* (2006.01)
*G01S 13/32* (2006.01)
*G01S 13/931* (2020.01)

(56) References Cited

U.S. PATENT DOCUMENTS

| | | | |
|---|---|---|---|
| 5,311,541 A | 5/1994 | Sanderford, Jr. | |
| 5,377,222 A | 12/1994 | Sanderford, Jr. | |
| 5,751,240 A | 5/1998 | Fujita et al. | |
| 6,317,076 B1 | 11/2001 | Ameen et al. | |
| 10,067,221 B2 * | 9/2018 | Ginsburg | G01S 7/352 |
| 11,137,476 B2 * | 10/2021 | Ginsburg | G01S 7/023 |
| 2004/0048574 A1 | 3/2004 | Walker et al. | |
| 2006/0181448 A1 | 8/2006 | Natsume et al. | |
| 2007/0018886 A1 | 1/2007 | Watanabe et al. | |
| 2007/0171122 A1 | 7/2007 | Nakano et al. | |
| 2009/0289831 A1 | 11/2009 | Akita et al. | |

FOREIGN PATENT DOCUMENTS

| | | |
|---|---|---|
| CN | 102608581 A | 7/2012 |
| CN | 102788980 A | 11/2012 |
| CN | 103840894 A | 6/2014 |
| JP | 3720803 B2 | 11/2005 |

OTHER PUBLICATIONS

First Office Action for Chinese Patent Application No. 20168020289574; dated: Nov. 30, 2020; 9 pages.

China National Intellectual Property Administration Search Report for Chinese Patent Application No. 20168020289574; 3 pages.

Inderdeep Kaur Aulakh, "Spectrum Sensing for Wireless Communication Networks", National Conference on Computing, Communication and Control (CCC-09), Oct. 2009, pp. 179-183, Punjab University, Chandigarh, Punjab, India.

Kannan Srinivasan and Philip Levis, "RSSI is Under Appreciated", Proceedings of the Third Workshop on Embedded Networked Sensors, May 2006, 5 pages.

Extended European Search Report, Application No. 16777309.4, mailed Mar. 6, 2018 (9 pages).

International Search Report and Written Opinion, App. No. PCT/US2016/026231, mailed Jul. 7, 2016 (6 pages).

* cited by examiner

INTERFERENCE DETECTION IN A FREQUENCY MODULATED CONTINUOUS WAVE (FMCW) RADAR SYSTEM

CROSS-REFERENCE TO RELATED APPLICATION

This application is a continuation of U.S. patent application Ser. No. 16/120,129, filed Aug. 31, 2018, which is a continuation of U.S. patent application Ser. No. 14/679,461, filed Apr. 6, 2015 (now U.S. Pat. No. 10,067,221), all of which are hereby incorporated by reference herein in their entirety.

BACKGROUND OF THE DISCLOSURE

Field of the Disclosure

Embodiments of the present disclosure generally relate to radar systems, and more specifically relate to detection of interference in a frequency modulated continuous wave (FMCW) radar system.

Description of the Related Art

Multiple radars operating simultaneously in a limited region have the potential to interfere with each other. This simultaneous operation can cause degradation in signal-to-noise ratio, potentially masking small objects, as well as cause ghost objects to appear. For frequency modulated continuous wave (FMCW) radar systems, this interference typically manifests itself over a short window of time within a chirp, and it is desirable to know when the interference occurs so that mitigation and/or avoidance techniques can be applied.

Current radar systems identify interference by measuring the variation of the power in the signal band during a chirp. While such systems measure the interference directly as it is happening, the measurements are corrupted by the presence of reflected signals also present in the signal band due to the desired operation of the radar.

SUMMARY

Embodiments of the present disclosure relate to methods and apparatus for interference detection in a frequency modulated continuous wave (FMCW) radar system. In one aspect, a frequency modulated continuous wave (FMCW) radar system is provided that includes a receiver configured to generate a digital intermediate frequency (IF) signal, and an interference monitoring component coupled to the receiver to receive the digital IF signal, in which the interference monitoring component is configured to monitor at least one sub-band in the digital IF signal for interference, in which the at least one sub-band does not include a radar signal.

In one aspect, a method for interference detection in a frequency modulated continuous wave (FMCW) is provided that includes receiving, in an interference monitoring component of the FMCW radar, a digital intermediate frequency (IF) signal from a receiver in the FMCW radar, and monitoring, by the interference monitoring component, at least one sub-band in the digital IF signal for interference, in which the at least one sub-band does not include a radar signal.

In one aspect, a frequency modulated continuous wave (FMCW) radar system is provided that includes a receiver configured to generate a digital intermediate frequency (IF) signal during transmission of a frame of chirps, a digital front end (DFE) component coupled to the receiver to receive the digital IF signal, in which DFE is configured to extract a radar signal band from the digital IF signal, and an interference monitoring component coupled to the receiver to receive the digital IF signal, in which the interference monitoring component is configured to monitor each sub-band of a plurality of sub-bands in the digital IF signal for interference, in which the radar signal band is not included in the plurality of sub-bands.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
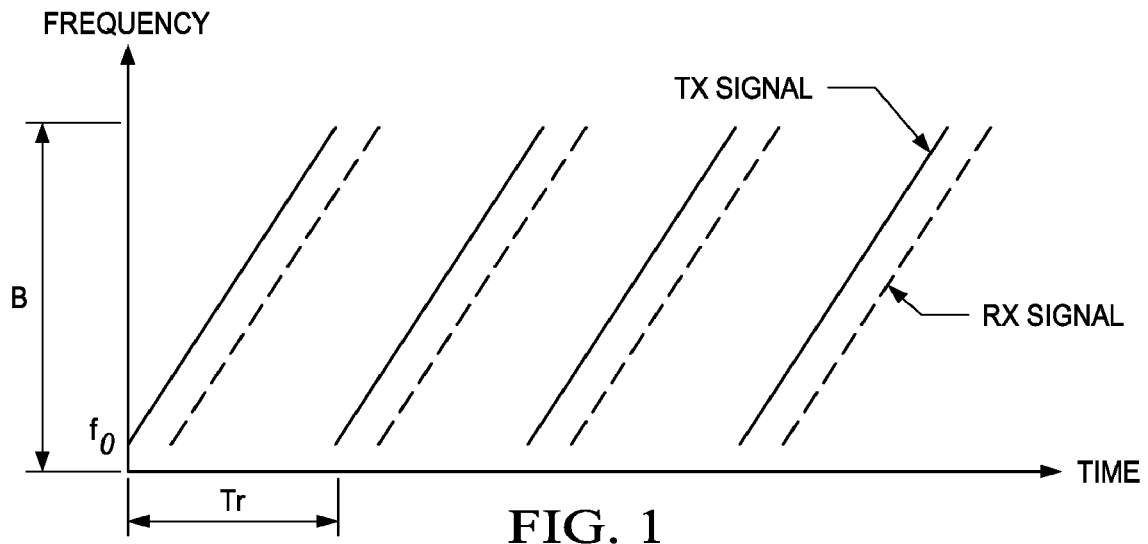
FIG. 1 and FIG. 2 are examples.

Specific embodiments of the disclosure will now be described in detail with reference to the accompanying figures. Like elements in the various figures are denoted by like reference numerals for consistency.

As previously mentioned, degradation in signal-to-noise (SNR) in an automotive radar system such as a FMCW radar system may occur due to interference introduced by multiple radar systems operating simultaneously. The degradation in SNR may potentially mask small objects and/or cause detection of ghost objects. If the interference can be detected when it occurs, steps may be taken to mitigate and/or avoid the interference.

As shown in the example of FIG. 1, in a frequency modulated continuous wave (FMCW) radar system, a ramp waveform, also referred to as a saw-tooth waveform, is used to generate a signal with linearly varying frequency in the time domain. The variation of the instantaneous frequency is proportional to the ramp waveform. The generated signal is transmitted and the delayed signal, as reflected from any objects in view of the radar, is received. The velocity and distance of the objects can be estimated from the intermediate frequency (IF) band in the received signal. Distance is measured by the frequency difference estimating the round-trip delay. Velocity is estimated by observing the same object across multiple chirps and looking at the phase rotation or movement of the frequency difference.

Figure 2:
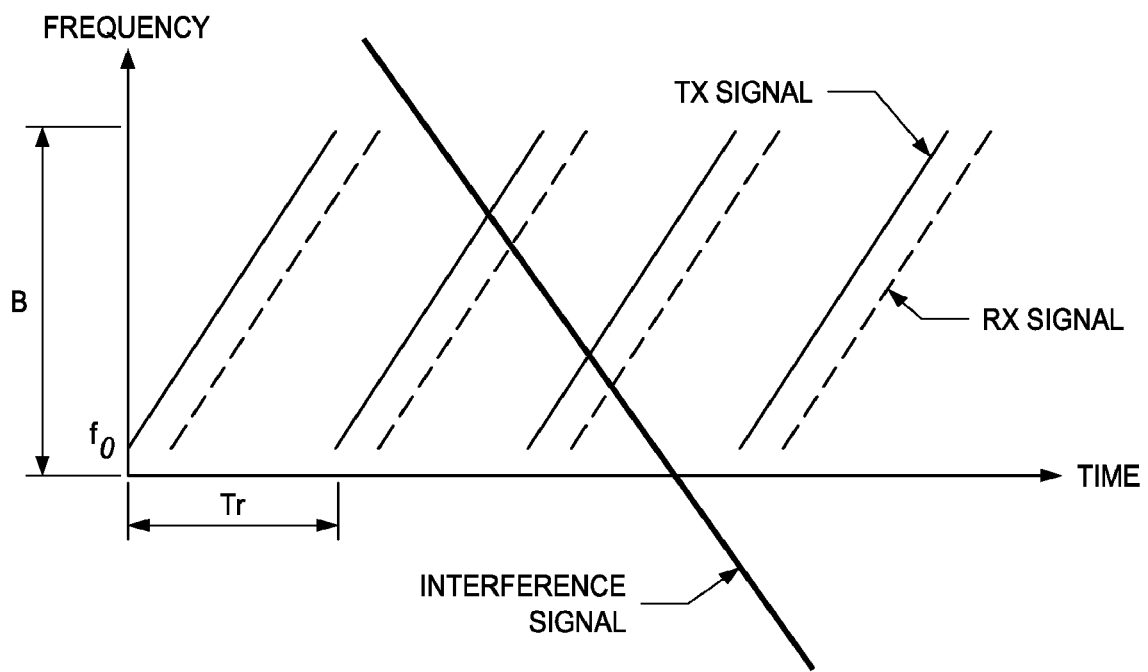

The example of FIG. 2 illustrates an interference signal crossing the received signal over time. Interference from other sources disturbs the FMCW radar only when the frequency offset of an interfering signal is within the IF bandwidth of the receiver. A crossing interference signal appears "impulse-like" in the baseband of the radar, which leads to an elevation of the noise floor in post-reception measurements. Current time and frequency domain interference mitigation solutions rely on knowing when the interference occurs. Current techniques for detecting when the interference occurs examine the in-band energy which means that the interference can be detected only if the interference is significantly higher than the many present desired reflected signals from the scene. In other words, in such techniques, the threshold for detection of unwanted interference is above the threshold at which loss of scene dynamic range occurs. The interference must be similar to or larger than the largest reflected signal and is much larger than faint reflections, which are already lost.

Embodiments of the disclosure provide for detection of interference based on energy in one or more sub-bands of the IF signal that do not include desired radar reflections. More specifically, embodiments determine whether or not interference is present in the sub-band where desired radar reflections are expected, i.e., the desired signal band or radar signal band, by examining the energy over time in at least one sub-band of the IF signal where reflected signals are not expected to be present. Interference is detected in a quiet region of the IF signal uncorrupted by desired radar reflections. Therefore, a higher SNR than prior art techniques operating on the radar signal band is achieved and smaller levels of interference can be detected. Further, in some embodiments, the time during a chirp when the interference is present can be localized.

Figure 3:
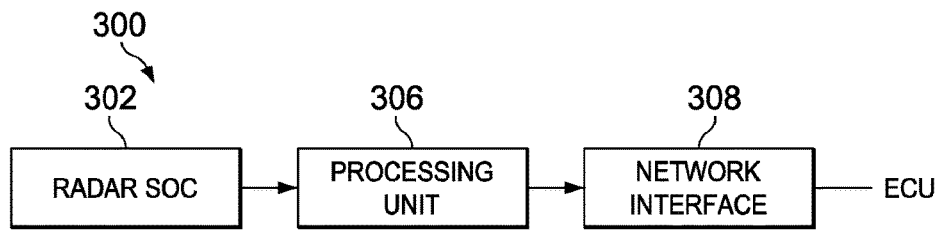
FIG. 3 and FIG. 4 are block diagrams of an example frequency modulated continuous wave (FMCW) radar system.

FIG. 3 is a block diagram of an example FMCW radar system 300 configured to perform interference detection during operation of the radar system 300. The example FMCW radar system 300 includes a radar system-on-a-chip (SOC) 302, a processing unit 306, and a network interface 308. The architecture of the radar SOC 302 is described in reference to FIGS. 4 and 5.

The radar SOC 302 is coupled to the processing unit 306 via a high speed serial interface. As is explained in more detail in reference to FIG. 4, the radar SOC 302 includes functionality to generate multiple digital intermediate frequency (IF) signals (alternatively referred to as dechirped signals, beat signals, or raw radar signals) that are provided to the processing unit 306 via the high speed serial interface. Further, as described in more detail in reference to FIG. 5, the radar SOC 302 includes functionality to perform interference monitoring in IF signals in which received signal strength indicator (RSSI) numbers are generated over time. As is well known, RSSI is an indication of the power level of the signal being received by a receive antenna. Therefore, the higher the RSSI number, the stronger the signal. Quantized RSSI numbers are provided to the processing unit 306 to be used for interference frequency detection and interference mitigation.

The processing unit 306 includes functionality to perform radar signal processing, i.e., to process the received radar signals to determine, for example, distance, velocity, and angle of any detected objects. The processing unit 306 may also include functionality to perform post processing of the information about the detected objects, such as tracking objects, determining rate and direction of movement, etc. Further, the processing unit 306 includes functionality to perform interference frequency detection based on the quantized RSSI numbers and to perform interference mitigation. Interference frequency detection and options for interference mitigation are described in more detail herein.

The processing unit 306 may include any suitable processor or combination of processors as needed for the processing throughput of the application using the radar data. For example, the processing unit 306 may include a digital signal processor (DSP), a microcontroller (MCU), an SOC combining both DSP and MCU processing, or a field programmable gate array (FPGA) and a DSP.

The processing unit 306 provides control information as needed to one or more electronic control units in the vehicle via the network interface 308. Electronic control unit (ECU) is a generic term for any embedded system in a vehicle that controls one or more the electrical system or subsystems in the vehicle. Types of ECU include, for example, electronic/engine control module (ECM), powertrain control module (PCM), transmission control module (TCM), brake control module (BCM or EBCM), central control module (CCM), central timing module (CTM), general electronic module (GEM), body control module (BCM), and suspension control module (SCM).

The network interface 308 may implement any suitable protocol, such as, for example, the controller area network (CAN) protocol, the FlexRay protocol, or Ethernet protocol.

Figure 4:
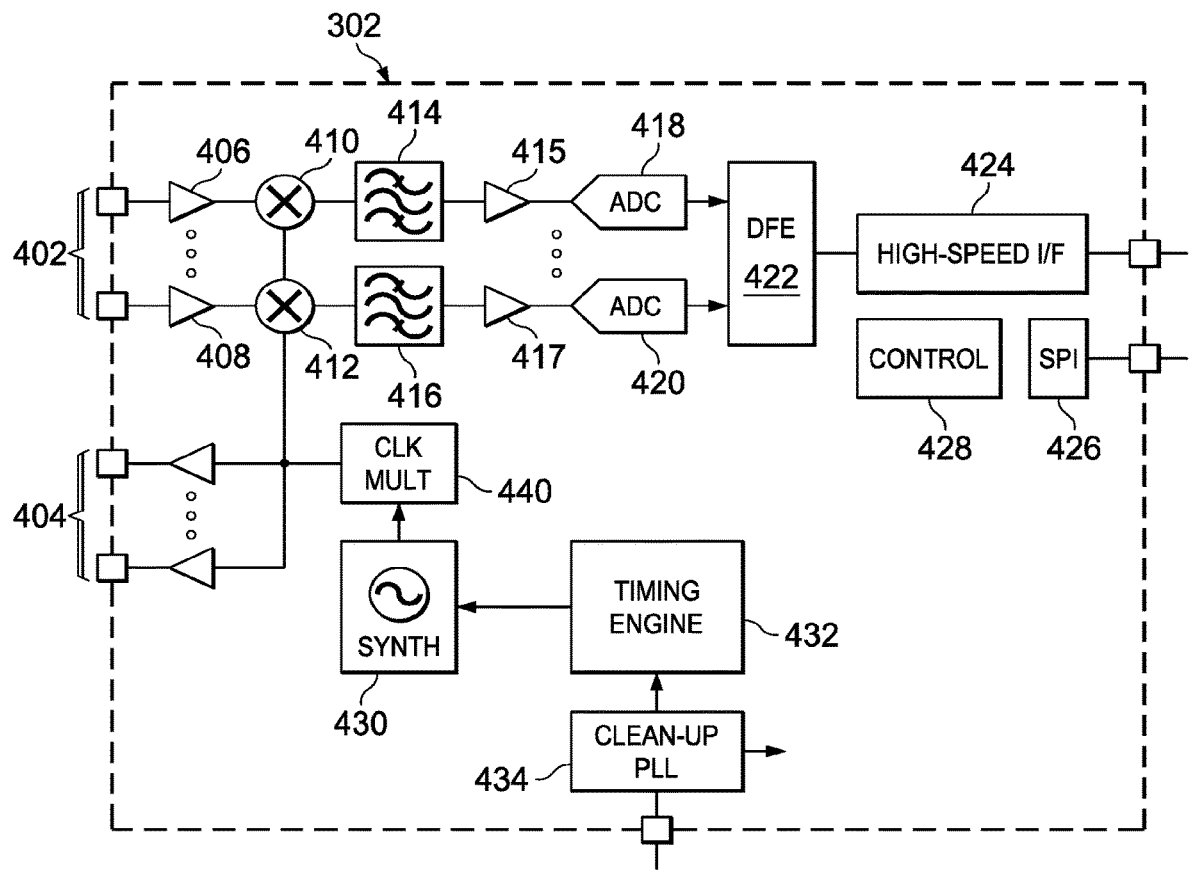

FIG. 4 is a block diagram of the radar SOC 302. The radar SOC 302 may include multiple transmit channels 404 for transmitting FMCW signals and multiple receive channels 402 for receiving the reflected transmitted signals. Further, the number of receive channels may be larger than the number of transmit channels. For example, an embodiment of the radar SOC 302 may have two transmit channels and four receive channels.

A transmit channel includes a suitable transmitter and antenna. A receive channel includes a suitable receiver and antenna. Further, each of the receive channels 402 are identical and include a low-noise amplifier 406,408 to amplify the received signal, a mixer 410, 412 to mix the transmitted signal with the received signal to generate an IF signal, a baseband bandpass filter 414, 416 for filtering the IF signal, a variable gain amplifier (VGA) 415, 417 for amplifying the filtered IF signal, and an analog-to-digital converter (ADC) 418, 420 for converting the analog IF signal to a digital IF signal. The bandpass filter, VGA, and ADC of a receive channel may be collectively referred to as a baseband chain or baseband filter chain. The mixers 406, 408 generate both the in-phase (I) and quadature (Q) components of the IF signal. The I component may be generated by mixing the incoming signal with $\cos(w_{LO}*t)$ and the Q component may be generated by mixing the incoming signal with $\sin(w_{LO}*t)$ where t is time in seconds and $w_{LO}=2*\pi*f_{LO}$ (units are radians/s) where $f_{LO}(t)$ is the instantaneous frequency of the transmitter at time t.

The receive channels 402 are coupled to a digital front end (DFE) component 422. The DFE 422 includes functionality to perform decimation filtering on the digital IF signals to reduce the data transfer rate. The DFE 422 may also perform other operations on the digital IF signals, e.g., DC offset removal. The DFE 422 further includes functionality to perform interference monitoring on the digital IF signal from one of the receive channels 402. This functionality is described in reference to FIG. 5. The DFE 422 is coupled to a high speed serial interface (I/F) 424 to transfer the decimated digital IF signals and the output of the interference monitoring to the processing unit 106.

The serial peripheral interface (SPI) 426 provides an interface for communication with the processing unit 306. For example, the processing unit 306 may use the SPI 426 to send control information, e.g., timing and frequencies of chirps, output power level, triggering of monitoring functions, etc., to the control module 428. The radar SOC 302 may use the SPI 426, for example, to send the results of monitoring functions to the processing unit 306.

The control module 428 includes functionality to control the operation of the radar SOC 302. In particular, the control module 428 includes functionality to receive chirp control information from the processing unit 306 and to use this control information to generate chirp parameters for the timing engine 432. The control module 426 may include, for example, an MCU that executes firmware to control the operation of the radar SOC 302 and to perform various monitoring functions.

The programmable timing engine 432 includes functionality to receive chirp parameter values for a sequence of chirps in a radar frame from the control module 428 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, an analog-to-digital (ADC) sampling time, a ramp end time, a transmitter start time, etc.

The radio frequency synthesizer (SYNTH) 430 includes functionality to generate FMCW signals for transmission based on chirp control signals from the timing engine 432. In some embodiments, the RSYNTH 430 includes a phase locked loop (PLL) with a voltage controlled oscillator (VCO).

The clock multiplier 440 increases the frequency of the transmission signal (LO signal) to the LO frequency of the mixers 406, 408. The clean-up PLL (phase locked loop) 434 operates to increase the frequency of the signal of an external low frequency reference clock (not shown) to the frequency of the SYNTH 430 and to filter the reference clock phase noise out of the clock signal.

Figure 5:
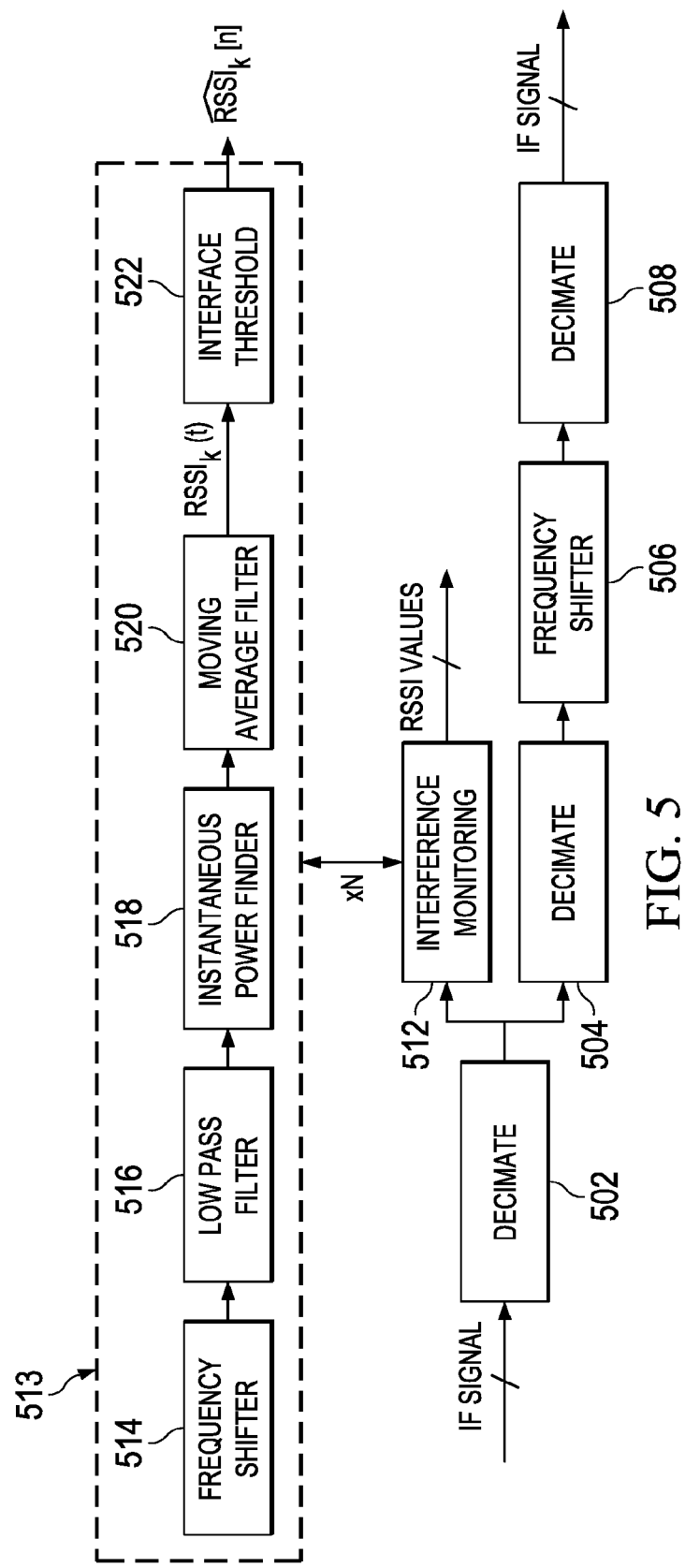
FIG. 5 is a block diagram of the digital front end (DFE) component of FIG. 4.

FIG. 5 is a block diagram of the DFE 422 illustrating both the interference monitoring functionality and the normal processing of IF signals. As previously mentioned, the digital IF signal from one of the receive channels 402 is monitored for interference. The block diagram is explained assuming that the digital IF signal from the ADC 418 is the one being monitored. Further, the ADC 418 is assumed to be a complex oversampling ADC. If the receive antennas are symmetric, then all receive channels have a similar view of any interference and any of the receive channels may be monitored for interference. If the receive antennas are not similar, then a receive channel with the widest beamwidth may be selected for monitoring in order to better detect any interfering signals.

The decimate component 502 of the DFE 422 receives the digital IF signal from the ADC 418 and decimates the signal for further processing. The decimated IF signal is then passed to both the normal processing path of the DFE 422 and the interference monitoring component 512. The normal processing path extracts the radar signal band from the decimated IF signal and further reduces the sample rate before the radar signal is output to the processing component 306. The desired radar signal band occupies from [0, $f_{IFBW}$] in the IF signal. The first decimation component 504 includes the desired signal of bandwidth [0, $f_{IFBW}$] with a minimum output sample rate of 2*$f_{IFBW}$. For real decimation filters, this signal also includes all of the information in [−$f_{IFBW}$, 0] which may contain unwanted interference. The frequency shifter component 506 moves the desired band to [−$f_{IFBW}$/2, $f_{IFBW}$/2] and the undesired band to |f|>$f_{IFBW}$/2. The final decimation component 508 reduces the output sample rate to $f_{IFBW}$ without any loss of desired band information.

The amount of decimation depends on the ratio of oversampling in the ADC 418 and the sub-bands monitored by the interference monitoring 512. For a sigma delta ADC, the oversampling ratio (OSR) (and hence total decimation ratio) is typically between 16 and 128, depending on desired SNR, order of the modulator, speed of the transistors, etc. For a pipeline or SAR (successive approximation register) ADC, the oversampling decimation ratio is typically 1-4 depending on the requirements of the analog anti-aliasing filter. In some embodiments, the ADC 418 is a sigma delta ADC. The total decimation ratio of the decimation components 502 and 504 equals the OSR. The decimation performed by the decimation component 502 is smaller than that of the decimation component 504 such that the out-of-band region is not completely removed. The out-of-band region is cleaned up by the decimation component 504 for the normal processing path. The output of the decimation component 502, which contains the out-of-band information, is used for interference monitoring. If the second Nyquist band is used for interference detection, the decimation component 502 is reduced by half and the decimation component 504 performs the final 2× decimation. If additional bands are used for interference detection, the decimation of the decimate component 502 and the decimate component are reduced accordingly.

The interference monitoring component 512 may include one or more interference monitoring paths 513. As will be better understood from the interference detection method descriptions of FIGS. 6-9, in various embodiments, one or more sub-bands of the IF signal may be monitored for interference. A sub-band may be a part of the band of the IF signal or may be the full band. If a maximum of N sub-bands can be concurrently monitored in a particular embodiment, then the DFE 422 includes N interference monitoring paths 513. The number of sub-bands that can be concurrently monitored in a particular radar system is a design decision.

An interference monitoring path 513 monitors a particular sub-band for interference, generating RSSI numbers over time and outputting quantized RSSI numbers indicative of one or more levels of interference in the monitored sub-band. The frequency shifter component 514 and the low pass filter component 516 operate to extract a sub-band of frequencies [$f_{iL}$, $f_{iU}$], where i=1, . . . , N and $f_L$ and $f_U$ are the lower and upper ends of the sub-band. The frequency shifter component 514 shifts the IF signal by −($f_{iU}$+$f_{iL}$)/2 such that the relevant band is centered at [−$f_{BW}$, +$f_{BW}$] where 2$f_{BW}$=|$f_{iL}$−$f_{iU}$|. The low pass filter component 516 outputs a signal of bandwidth $f_{BW}$.

The instantaneous power finder component 518 determines the instantaneous power of the sub-band signal. As is well known, instantaneous power is the power in a signal at the time the measurement is made. The instantaneous power finder component 518 determines the instantaneous power as $I^2+Q^2$. The instantaneous power is calculated for every sample m at the output of the low pass filter component 516. Each sample m corresponds to a different time point t=m*$T_s$, where $T_s$ is the sampling rate of the system.

The moving average filter component 520 determines the RSSI number of the sub-band signal at time t. As is well known, a moving average filter averages values across a fixed subset of sequential incoming values, in which as a new sample comes in, the oldest sample is dropped from the subset and the new sample is added. The size of the fixed subset, which is also referred to as the width of the moving average filter, may be programmable and may be selected based on the relative rate at which interference is expected to cross the IF signal. A wider moving average filter will reduce noise but may tend to suppress rapidly moving interference signals. In some embodiments, the width may be varied, e.g., 0.5 to 10 us, based on the ramp rate where faster ramp rates will result in narrower filter widths.

In some embodiments, the output of the moving average filter component 520 is an RSSI value for each incoming sample. In some embodiments, the output of the moving average filter is decimated such that the output of the moving averaging filter component 520 is at a lower sample rate. The amount of decimation may be programmable and the decimation ratio selected as a tradeoff between more precisely localizing any interference (smaller decimation ratio preferred) and the amount of data sent to the processing unit 306 (higher decimation ratio preferred).

The interference threshold component 522 quantizes the RSSI numbers from the moving average filter component 520 using three interference thresholds, E1, E2, and E3. The thresholding performed by the interference threshold component 522 is a quantization process that converts an RSSI number, which may be, for example, sixteen bits, into a two bit number, i.e., an interference impact indicator, that contains sufficient information to allow the processing unit 306 to make decisions regarding any detected interference. This quantization significantly reduces the data rate to the processing unit 306 without losing the information needed to detect medium and large amplitude interference. Table 1 illustrates the use of the three thresholds. The particular values of the thresholds and the two bit encoding for the impact indicators are implementation dependent and may be programmable in some embodiments.

TABLE 1

| RSSI Number | Impact |
| --- | --- |
| <E1 | No interference |
| E1–E2 | Moderate interference → slight radar degradation |
| E2–E3 | High interference → medium radar degradation |
| >E3 | Severe interference → no radar operation possible |

The output of the interference monitoring component 512 may be characterized as $\overline{RSSI}_k[n]$, i.e., the quantized RSSI (interference impact indicator) of the kth frequency sub-band at the nth time step. In one embodiment, the $\overline{RSSI}_k[n]$ values for each of the monitored sub-bands are interleaved when transmitted to the processing unit 306, e.g., $\overline{RSSI}_0[0n]$, $\overline{RSSI}_1[0], \ldots, \overline{RSSI}_M[0], \overline{RSSI}_0[1], \ldots$, where M is the number of monitored sub-bands. The processing unit 306 then sorts the interleaved values into individual streams for each sub-band. In another embodiment, the values are passed to the processing unit 306 as a triplet (k, n, $\overline{RSSI}_k[n]$), which is useful if not all of the values are passed to the processing unit 306, e.g., not sending any information for RSSI<E1.

The processing unit 306 can use the impact indicators for a sub-band k to determine information such as the frequency of any interference and the time of the interference. For example, assume that interference is present between $\overline{RSSI}_k[n1, n2]$, where the sampling rate of the impact indicators is 1 µs. Thus, the detected interference is present for (n2−n1)*1 µs. If sub-band k covers IF frequencies [$f_A$, $f_B$], then the relative frequency slope magnitude of the interference versus the LO of the radar is $$\left| \frac{f_A - f_B}{(n2 - n1) * 1 \, \mu s} \right|.$$

Further, the sign of the relative slope can be determined by looking at an adjacent sub-band if multiple sub-bands are being monitored. If sub-band k+1 covers IF frequencies [$f_B$, $f_C$] and the interference is present in sub-band k+1 after sub-band k, the sign the relative slope can be determined as sign($f_C-f_A$).

Figure 6:
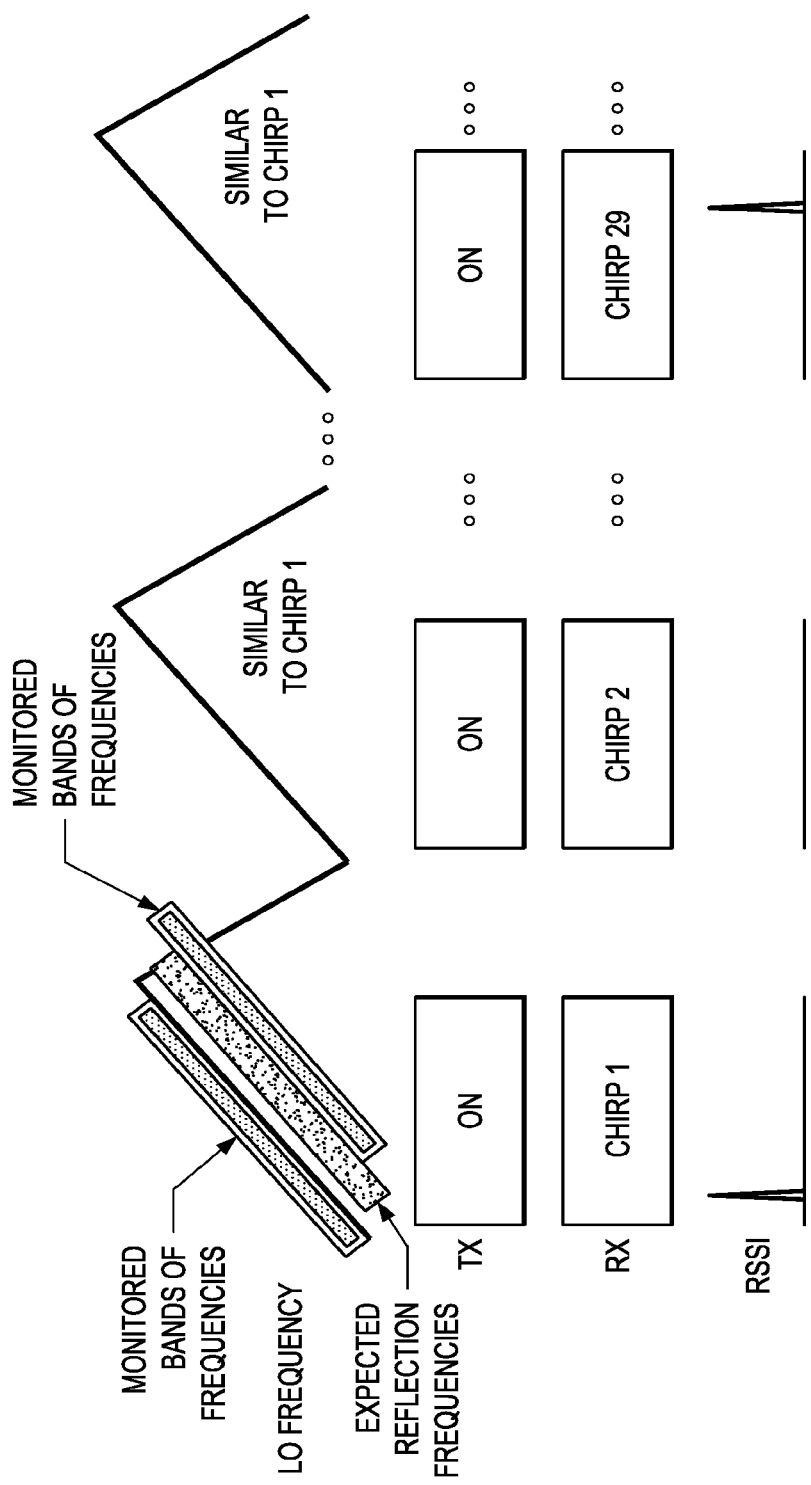
FIG. 6, FIG. 7, FIG. 8, and FIG. 9 are examples illustrating methods for interference detection in the FMCW radar system of FIGS. 3-5.
Figure 7:
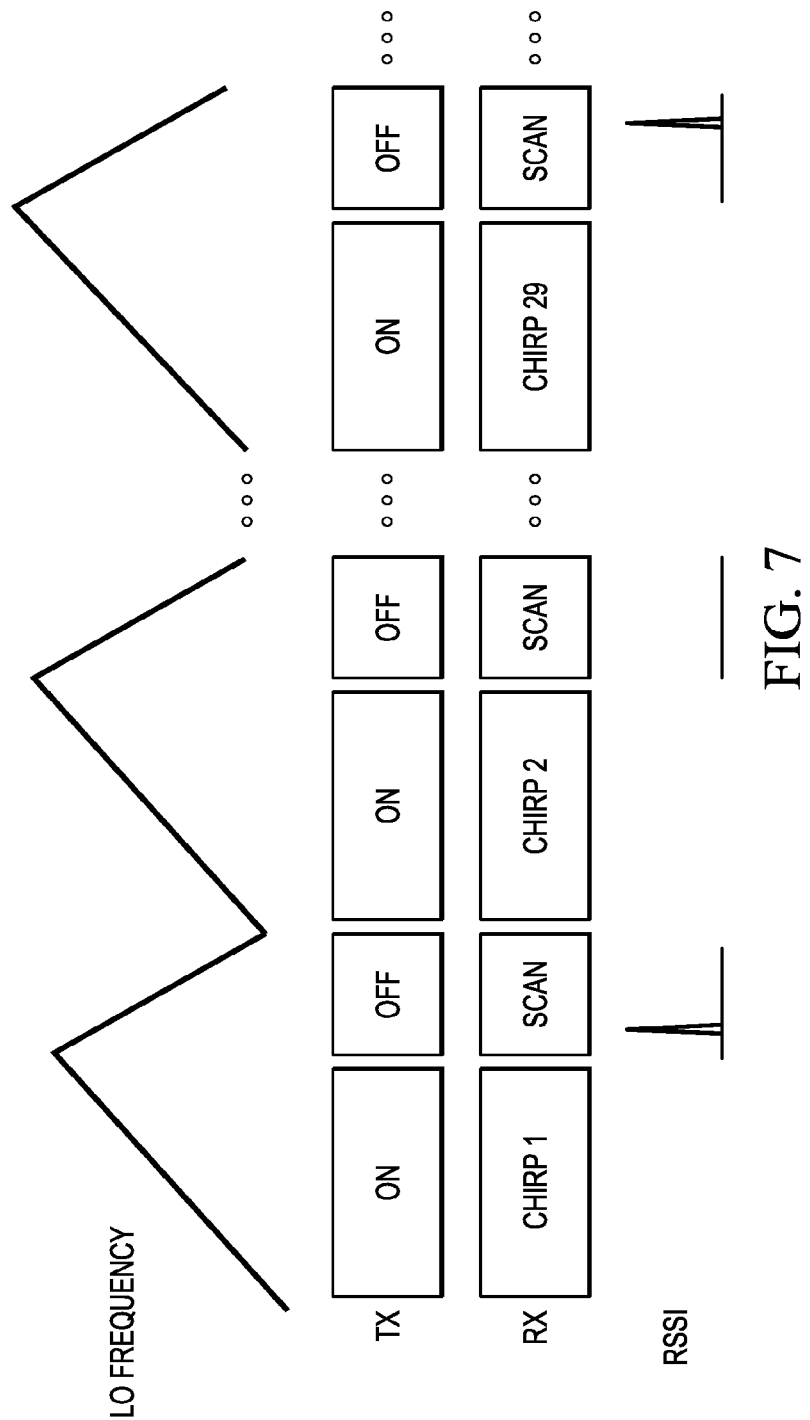

FIG. 6 is an example illustrating a method for interference detection that can be performed in the radar system 300. In this method, the interference monitoring is performed during chirp transmissions, i.e., the transmitters are on. Interference monitoring is performed in one or more of the sub-bands of the IF signal outside the band having the expected reflected signal, i.e., the radar signal band. For example, two sub-bands may be monitored as depicted in FIG. 7, i.e., the image band (or a sub-band thereof) and the $2^{nd}$ (upper) Nyquist band (or a sub-band thereof). With this method, interference crossing the radar signal band or "close-by frequency" interference which may potentially move into the radar signal band can be detected.

More specifically, during a chirp, the reflected signal is expected in the frequency range $$f_c(t) + \frac{B}{T_r} * (0, MaxRoundTripDelay)$$

where $f_c(t)$ is the current transmitted frequency, B is the bandwidth of the IF signal and $T_r$ is the length of the chirp ramp. The value of MaxRoundTripDelay depends on the target range of the radar system 300. If the target range is Dmax meters, then MaxRoundTripDelay=2*Dmax/c, where c is the speed of light. This corresponds to a radar signal intermediate frequency range of $(0, F_{BeatMax})$Hz where $F_{BeatMax}$ is B/Tr*(2Dmax/c). Thus, the frequency range of the image band is $(-F_{BeatMax}, 0)$ and the frequency range of the upper Nyquist band is $(F_{BeatMax}+\Delta_1, F_{BeatMax}+\Delta_2)$ where the values of $\Delta_1$ and $\Delta_2$ may be chosen based on ease of implementation.

The intent of this method is to measure interference in a sub-band without other energy present in the sub-band. The limitations on this method may be: (1) in the image band, there may be energy that folded over from the radar signal band; and (2) in the second Nyquist band, there may be weak reflections from distant objects, harmonic distortion and intermodulation from objects in the radar signal band, and excess quantization noise from the oversampling ADC. However, the ratio of interference to non-interference may be increased by 40 dB by measuring interference outside of the radar signal band.

To implement this method for two sub-bands, the interference monitoring component 512 includes at least two interference monitoring paths 513. In one of the monitoring paths, the frequency shifter component 514 and the low pass filter component 516 are configured to extract the image sub-band and in another of the monitoring paths, the frequency shifter component 514 and the low pass filter component 516 are configured to extract the upper Nyquist sub-band. The interference monitoring component 512 generates interference impact indicators for each of these sub-bands.

The processing unit 306 may use the received interference impact indicators for the two sub-bands to mitigate the presence of interference. For example, if the interference impact indicators indicate the presence of severe or high interference in one or both of the sub-bands, the processing unit 306 may mark the corresponding time samples within corresponding chirps that occur near the detected interference as corrupted. In particular, given that the two sub-bands straddle the radar signal band, if interference is detected first in one sub-band and then, after a gap, in the other, the chirp samples in between are likely corrupted by interference and can be marked.

The radar signal processing in the processing unit 306 can then use this information to mitigate the impact of the corrupted chirps. In another example, the processing unit 306 may zero out all samples for the previous chirps from all receive channels 402 and/or the next chirps. In another example, the processing unit 306 may use this information to change the frequency for subsequent chirps in the frame and/or for a subsequent frame of chirps.

FIG. 7 is an example illustrating a method for interference detection that can be performed in the radar system 300. In this method, the interference monitoring is performed between chirp transmissions in a frame of chirps. After each chirp during the chirp recover/blank time, the transmitters are turned off and a scan in the active frequency range of the chirp is performed. In a 77 GHz radar system, this active frequency range can be anywhere from 100 Mhz to 4 GHz depending on the chirp configuration. During the scan, the LO frequency is varied as a result of the ramp back of the LO and interference impact indicators are generated by the interference monitoring component 512 from the signal received in the monitored receive channel 402. In this method, one sub-band of the IF signal is monitored which is the full bandwidth of the IF signal.

The processing unit 306 may use the received interference impact indicators to mitigate the presence of interference. For example, the processing unit 306 may use the received indicators to create a frequency occupancy map of which frequencies have interference and the strength of the interference. The map can be of a single scan or an accumulation of scans. After observing the strength and frequency of the interference, the processing unit 306 can select a suitable band for future transmission with a minimum interference over a contiguous frequency spectrum.

Note that the methods of FIGS. 6 and 7 can be used simultaneously. During the "up" ramp of a chirp, the method of FIG. 6 can be performed in which interference can be measured in neighboring sub-bands of the radar signal band, and corrupted samples in corresponding chirps can be detected. During the "down" ramp when the transmitters are off, the method of FIG. 7 can be performed to track the bands where interference is present.

Figure 8:
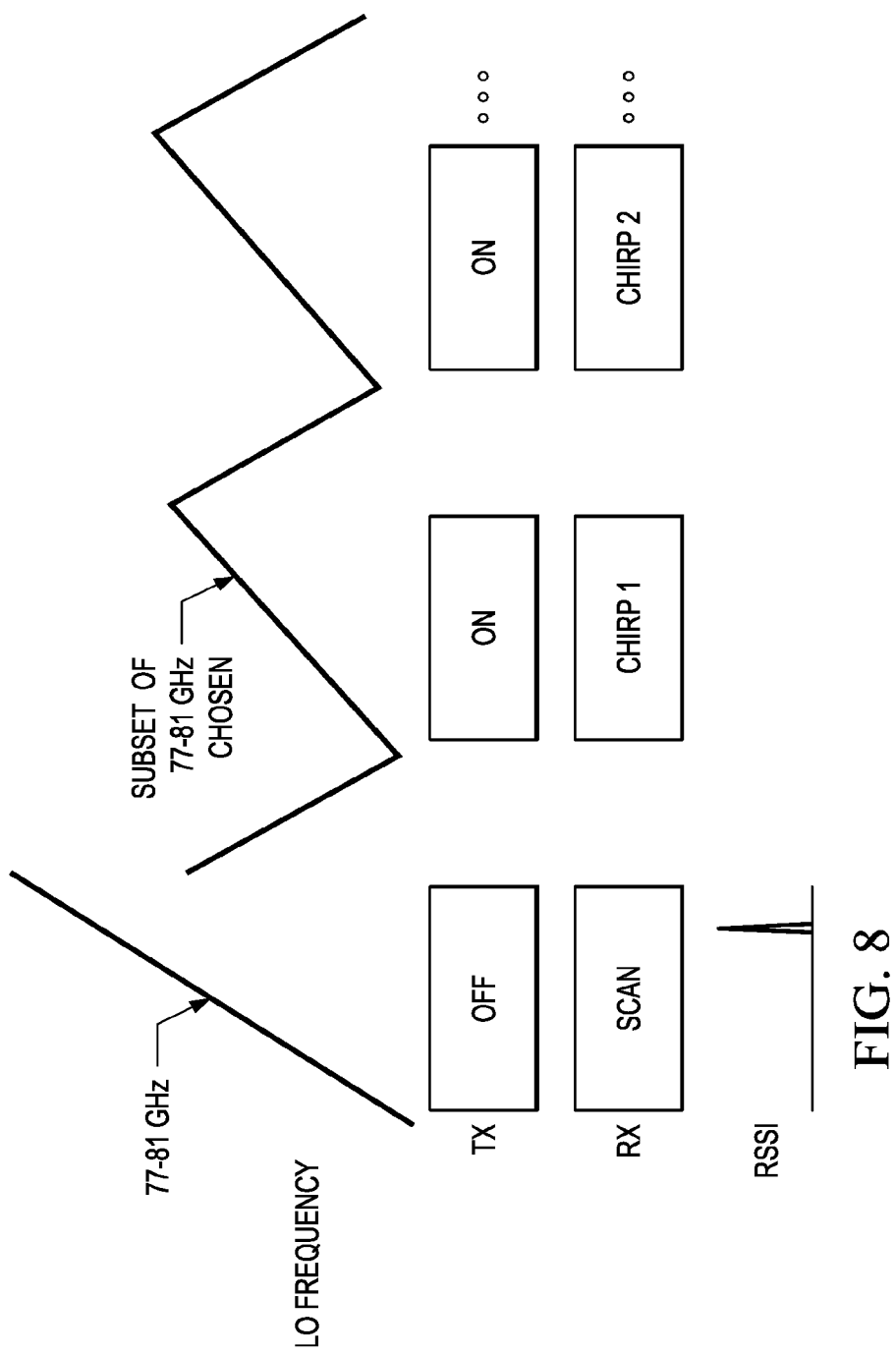

FIG. 8 is an example illustrating a method for interference detection that can be performed in the radar system 300. In this method, the interference monitoring is performed before the transmission of a frame of chirps while the transmitters are off. In this method, a scan of the full frequency range, e.g., 4 GHz, is performed. During the scan, the LO frequency is varied and interference impact indicators are generated by the interference monitoring component 512 from the signal received in the monitored receive channel 402. In this method, one sub-band of the IF signal is monitored which is the full bandwidth of the radar system 300.

The processing unit 306 may use the received interference impact indicators to mitigate the presence of interference. For example, the processing unit 306 may use the indicators to determine interference free frequencies. The processing unit 306 may then program the radar SOC to use an identified interference free frequency range for transmission of the subsequent frame of chirps.

Figure 9:
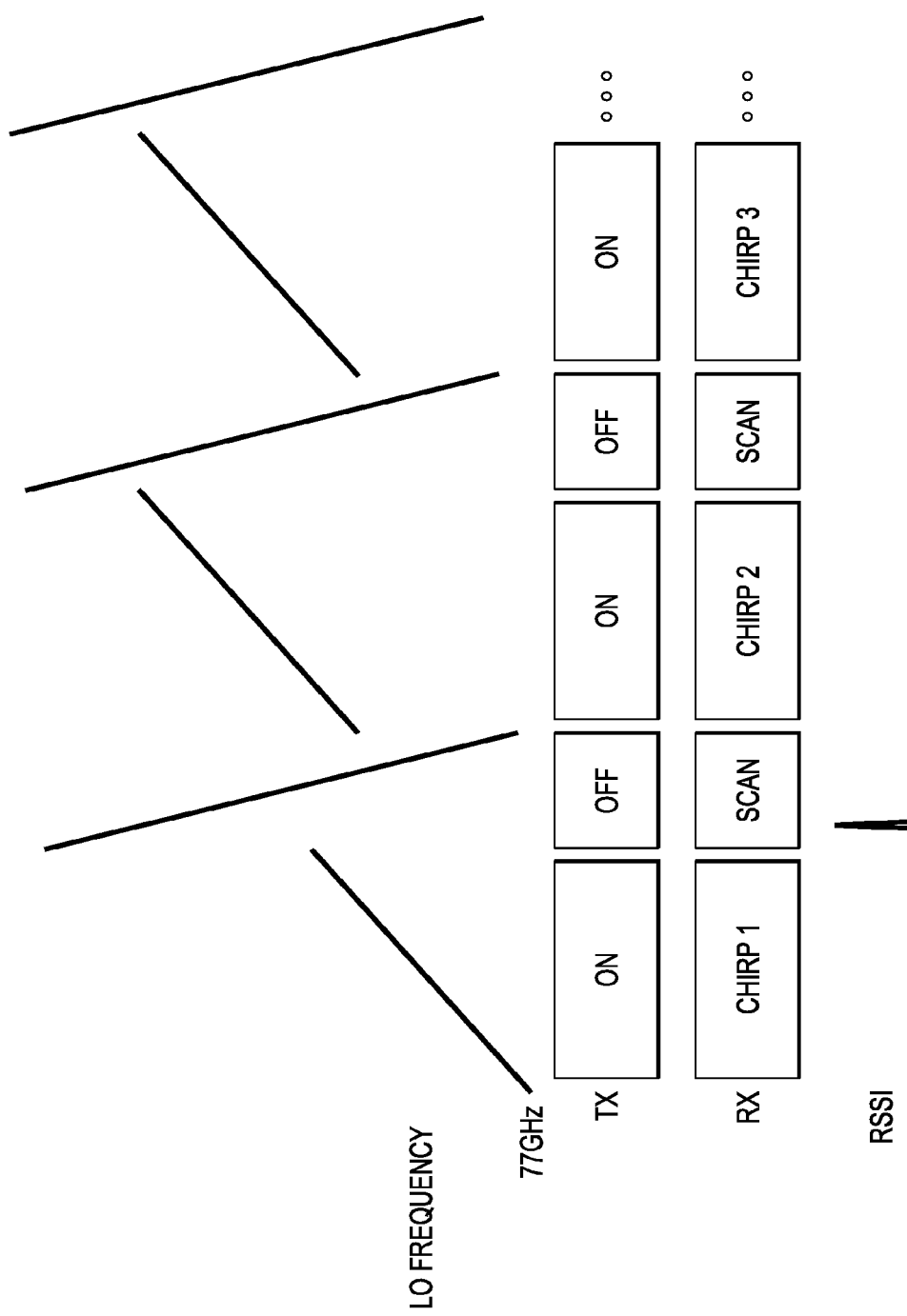

FIG. 9 is an example illustrating a method for interference detection that can be performed in the radar system 300. In this method, the interference monitoring is performed during the chirp recover/blank time between selected chirp transmissions in a frame of chirps. That is, the interference monitoring may be performed, for example, after each chirp, between subsets of chirps, or after chirps with a sufficient bandwidth down ramp. In this method, a scan of the full frequency range, e.g., 4 GHz, is performed. During the scan, the LO frequency is varied and interference impact indicators are generated by the interference monitoring component 512 from the signal received in the monitored receive channel 402. In this method, one sub-band of the IF signal is monitored which is the full bandwidth of the radar system 300.

The processing unit 306 may use the received interference impact indicators to mitigate the presence of interference. For example, the processing unit 306 may use the indicators to determine interference free frequencies. The processing unit 306 may then program the radar SOC to use an identified interference free frequency range for transmission of subsequent chirps in the frame and/or for transmission of the next frame of chirps.

Figure 10:
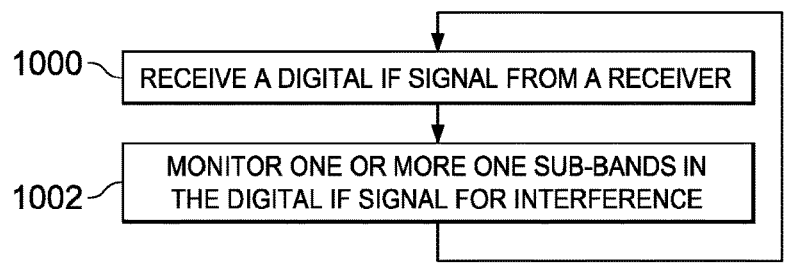
FIG. 10 is a flow diagram of a method for interference detection in the FMCW radar system of FIGS. 3-5.

FIG. 10 is a flow diagram of a method for interference detection that can be performed in the radar system 300. This method may be performed continuously while the radar system 300 is operating. Initially, a digital IF signal is received 1000 from the receiver (receive channel) in the radar system 300 that is being monitored to detect interference. The digital IF signal is received in the interference monitoring component 512. The interference monitoring component 512 monitors 1002 one or more sub-bands (depending on the method embodiment) in the digital IF signal for interference. In some embodiments, one sub-band is monitored. Examples of such monitoring are previously described herein. In some embodiments, multiple sub-bands are monitored. Examples of such monitoring are previously described herein.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the interference frequency detection and interference mitigation processing is performed by a processing unit in the radar system external to the radar SOC. One of ordinary skill in the art will understand embodiments in which some or all of such processing is performed by a processing unit on the SOC, e.g., the control module of the SOC or another processor on the SOC.

In another example, embodiments have been described herein in which a clock multiplier is used. One of ordinary skill in the art will understand embodiments in which the multiplier is not needed because the SYNTH operates at the LO frequency rather than a lower frequency.

In another example, embodiments have been described herein in which the transmission signal generation circuitry is assumed to a radio frequency synthesizer. One of ordinary skill in the art will understand embodiments in which this circuitry is an open loop oscillator (radio frequency oscillator) plus a digital-to-analog converter (DAC) or other suitable transmission signal generation circuitry.

In another example, embodiments have been described herein in which interference monitoring is performed on a single receive channel when multiple receive channels are present. One of ordinary skill in the art will understand embodiments in which more than one receive channel is monitored for interference. For example, if receiver antennas point in different directions, interference monitoring may be performed in multiple, if not all, receive channels.

In some embodiments in which more than one receive channel is monitored, the interference monitoring component is replicated for each receive channel to be monitored. In some such embodiments, the RSSI values from each of the interference monitoring component may be combined, e.g., averaged, and the combined results used to ascertain the presence and properties of the interference. This approach may be referred to as hard combining. In another embodiment, the outputs of the moving average filtering components of the interference monitoring components are combined, e.g., averaged, to generate a combined output. One interference threshold component then operates on that combined output. This approach may be referred to as soft combining. These embodiments may provide improved interference monitoring performance in terms of sensitivity to interference and accuracy of identification of the slope of the interference frequency, etc., at the cost of additional power consumption.

In another example, in some embodiments, the IF signals from multiple receive channels are combined, e.g., by summation, and the combined signal provided to a single interference monitoring component. Given that the frequency of the interference is expected to vary quickly over any single chirp, such linear combination is acceptable as there is no concern that the interference signals in different channels will coherently subtract from each other or coherently reinforce each other for all the IF frequencies.

In another example, embodiments have been described herein in which quantized RSSI numbers are provided to the external processing unit. One of ordinary skill in the art will understand embodiments in which the RSSI data is not quantized on the radar SOC.

In another example, embodiments have been described herein in which the RSSI numbers are quantized using three thresholds. One of ordinary skill in the art will understand embodiments in which more or fewer thresholds are used.

In another example, embodiments have been described herein in which all quantized RSSI numbers are provided to the processing unit, including those that indicate little to no interference. One of ordinary skill in the art will understand embodiments in which those quantized RSSI numbers indicating little to no interference are not provided to the processing unit.

In another example, one of ordinary skill in the art will understand embodiments in which one or more of the components of the interference monitoring path(s) are programmable.

In another example, embodiments have been described herein in which interference monitoring paths do not share components. One of ordinary skill in the art will understand embodiments in which one or more of the components may be shared between interference monitoring paths.

In another example, embodiments have been described herein in which a frequency shifter component and a low pass filter component are used to extract a sub-band for interference monitoring. One of ordinary skill in the art will understand embodiments in which a band pass filter is used instead. Further, one of ordinary skill in the art will understand embodiments in which rather than having each interference monitoring path include one or more components to extract a sub-band, a filter bank is used to extract the desired sub-bands for each of the interference monitoring paths.

In another example, one of ordinary skill in the art will understand embodiments in which the moving average filter component implements a block averaging filter in which rather than adding one new sample to the subset and dropping the oldest sample, a block of new samples may be added to the subset and a corresponding number of oldest samples is dropped. One of ordinary skill in the art will understand that the use of a block averaging filter reduces the sample rate of the output of the moving average filter component.

In another example, embodiments have been described herein in which the ADC in the monitored receive channel is a complex oversampling ADC. One of ordinary skill in the art will understand embodiments in which the ADC is a complex ADC or an oversampling ADC. In an oversampling real ADC, the image band cannot be distinguished from the radar signal band, but multiple bands beyond Nyquist can be observed.

In another example, embodiments have been described herein in which interference monitoring is performed in one or both of the image sub-band and the upper Nyquist sub-band. One of ordinary skill in the art will understand embodiments in which either or both of these sub-bands is further split into sub-bands for monitoring. Monitoring additional sub-bands provides better granularity when estimating the slope of an interfering and for handling multiple interfering signals. Further, one of ordinary skill in the art will understand embodiments in which sub-bands farther out, e.g., sub-bands of 3rd and/or 4th Nyquist bands, are also monitored for interference.

In another example, determination of RSSI number in multiple sub-bands may be implemented by performing a fast Fourier transform (FFT) of the input to interference monitoring component and summing up the magnitude or power of the FFT bins corresponding to each sub-band to yield RSSI numbers for each sub-band. The FFT may be performed for many time durations of samples—one FFT per time duration and the RSSI (or impact indicator) results compared over successive results to identify the direction and slope of the interference frequency.

In another example, one of ordinary skill in the art will understand embodiments in which the thresholds used by the interference threshold component may differ for each monitored sub-band. The thresholds for detecting the presence of the interference and the interference impact may be designed for each sub-band based on the gain response of the components of the receive channel versus the IF frequency and also the noise power versus IF frequency. This is particularly applicable for $2^{nd}$ and higher Nyquist bands, where typical receivers may have higher noise power, e.g., those employing Sigma Delta ADCs, and lower gain due to IF filter droops and the low pass filter nature of IF filters.

In another example, embodiments have been described herein in which the FMCW radar system includes a radar SOC and a processing unit. One of ordinary skill in the art will understand embodiments for other FMCW radar system architectures. Further, one of ordinary skill in the art will understand embodiments in which the interference monitoring component is on a chip separate from the radar frontend. In such embodiments, the output of the decimation component 502 may be provided to this chip via a high speed serial interface.

In another example, embodiments have been described herein in which the interference monitoring is performed in hardware. One of ordinary skill in the art will understand embodiments in which some or all of the interference monitoring may be implemented in software.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A radar system comprising:
   transmitter circuitry configured to transmit a chirp;
   receiver circuitry configured to:
      receive a radar reflection based on the transmitted chirp; and
      generate a digital intermediate frequency (IF) signal based on the received radar reflection; and
   interference monitoring circuitry coupled to the receiver circuitry and configured to:
      receive the digital IF signal;
      extract at least one sub-band in the digital IF signal; and
      detect energy over time in the at least one sub-band in the digital IF signal to determine whether or not interference is present in the at least one sub-band.

2. The radar system of claim 1, in which the interference monitoring circuitry is configured to perform interference monitoring during transmission of the chirp.

3. The radar system of claim 2, in which interference monitoring circuitry is configured to determine the at least one sub-band as being outside of a band in which the received radar reflection is expected to be in.

4. The radar system of claim 3, in which the at least one sub-band includes one or both of: all or a sub-band of an image band of the digital IF signal, and all or a sub-band of an upper Nyquist band of the digital IF signal.

5. The radar system of claim 4, in which the interference monitoring circuitry includes a frequency shifter and a filter configured to operate to extract one or both of the image band and the upper Nyquist band.

6. The radar system of claim 5, in which the interference monitoring circuitry is configured to generate a set of time-based interference impact indicators for the at least one sub-band.

7. The radar system of claim 6, in which the set of time-based interference impact indicators for the at least one sub-band is derived from a set of time-based received signal strength (RSSI) values for the at least one sub-band.

8. The radar system of claim 1, in which:
   the transmitter circuitry is configured to transmit a set of chirps including the chirp, the transmitter circuitry further configured to turn off between transmission of consecutive chirps of the set of chirps;
   the receiver circuitry is configured to receive a set of radar reflections including the radar reflection, the set of radar reflections respectively based on the transmitted set of chirps, and generate a digital intermediate frequency (IF) signal for each radar reflection of the set of radar reflections; and
   the interference monitoring circuitry is configured to scan a select frequency range of the chirps during at least one time during which the transmitter circuitry is turned off and during which a frequency of an internally-generated transmission signal decreases.

9. The radar system of claim 8, in which the interference monitoring circuitry is configured to monitor at least one IF signal of the IF signals and generate a set of time-based interference impact indicators for the at least one IF signal.

10. The radar system of claim 9, further comprising:
   a processor configured to generate a frequency occupancy map based on the set of time-based interference impact indicators.

11. The radar system of claim 1, further comprising decimate circuitry configured to receive the digital IF signal, perform a decimation operation on the digital IF signal to generate a decimated IF signal, and provide the decimated IF signal to the interference monitoring circuitry.

12. The radar system of claim 11, wherein the interference monitoring circuitry includes extraction circuitry configured to extract the at least one sub-band in the digital IF signal.

13. The radar system of claim 12, wherein the interference monitoring circuitry further includes power determining circuitry coupled to the extraction circuitry and configured to determine a power value of each of multiple samples of the at least one sub-band in the digital IF signal at a respective time.

14. The radar system of claim 13, wherein the interference monitoring circuitry further includes a filter coupled to the power determining circuitry and configured to determine a received signal strength (RSSI) value at each of multiple specific times based on an average of the power values in a window encompassing the respective specific time.

15. The radar system of claim 14, wherein each of the RSSI values is represented by x bits, and the interference monitoring circuitry further includes a threshold circuit coupled to the filter and configured to apply a threshold to each of the RSSI values to generate a corresponding interference impact indicator represented by less than x bits.

16. The radar system of claim 12, in which the extraction circuitry includes a frequency shifter and a low-pass filter.

17. A radar system comprising:
   transmitter circuitry configured to transmit a set of chirps, the transmitter circuitry further configured to turn off between transmission of consecutive chirps of the set of chirps;
   receiver circuitry configured to:
      receive a set of radar reflections respectively based on the transmitted set of chirps; and
      generate a set of digital intermediate frequency (IF) signals based on the set of received radar reflections; and
   interference monitoring circuitry coupled to the receiver circuitry and configured to:
      perform first interference monitoring on at least one sub-band in at least one digital IF signal of the set of digital IF signals during transmission of the corresponding chirp; and
      perform second interference monitoring during at least one time during which the transmitter circuitry is turned off.

18. The radar system of claim 17, in which:
the first interference monitoring includes detecting energy over time in the at least one sub-band to determine whether or not interference is present in the at least one sub-band; and
the second interference monitoring includes scanning a select frequency range of the set of chirps during the at least one time during which the transmitter circuitry is turned off and during which a frequency of a transmission signal decreases.

19. A radar system comprising:
transmitter circuitry configured to transmit a set of chirps, the transmitter circuitry further configured to turn off for a recovery time after transmission of each chirp of the set of chirps and turn back on at the end of the recovery time to transmit a next chirp of the set of chirps;
receiver circuitry configured to:
  receive a set of radar reflections respectively based on the transmitted set of chirps; and
  generate a set of digital intermediate frequency (IF) signals based on the set of received radar reflections; and
interference monitoring circuitry coupled to the receiver circuitry and configured to:
  during at least one recovery time, vary the frequency of an internally-generated transmission signal scan a select frequency range of the chirps, scan a frequency range of the set of chirps, and generate interference impact indicators for at least one digital IF signal of the set of digital IF signals.

* * * * *